United States Patent
Simmons

(10) Patent No.: US 11,597,169 B2
(45) Date of Patent: Mar. 7, 2023

(54) PICKLEBALL PADDLE AND METHOD OF MANUFACTURE

(71) Applicant: Indian Industries, Inc., Evansville, IN (US)

(72) Inventor: Jay Randall Simmons, Anthem, AZ (US)

(73) Assignee: Indian Industries, Inc., Evansville, IN (US)

( * ) Notice: Subject to any disclaimer, the term of this patent is extended or adjusted under 35 U.S.C. 154(b) by 0 days.

(21) Appl. No.: 17/393,689

(22) Filed: Aug. 4, 2021

(65) Prior Publication Data

US 2022/0040937 A1    Feb. 10, 2022

Related U.S. Application Data

(60) Provisional application No. 62/706,172, filed on Aug. 4, 2020.

(51) Int. Cl.
| | |
|---|---|
| *B29C 70/44* | (2006.01) |
| *B29C 70/68* | (2006.01) |
| *B29C 70/54* | (2006.01) |
| *B29L 31/52* | (2006.01) |
| *B29K 75/00* | (2006.01) |

(52) U.S. Cl.
CPC .............. *B29C 70/44* (2013.01); *B29C 70/54* (2013.01); *B29C 70/68* (2013.01); *B29K 2075/00* (2013.01); *B29L 2031/5245* (2013.01)

(58) Field of Classification Search
CPC ...................................................... B29C 70/44
See application file for complete search history.

(56) References Cited

U.S. PATENT DOCUMENTS

| | | | | | |
|---|---|---|---|---|---|
| 4,983,242 | A | * | 1/1991 | Reed | B32B 5/10 |
| | | | | | 264/258 |
| 6,234,921 | B1 | * | 5/2001 | Davis | A63B 60/02 |
| | | | | | 473/535 |

FOREIGN PATENT DOCUMENTS

| | | | |
|---|---|---|---|
| CN | 1227763 A | * | 9/1999 |
| FR | 2597356 A1 | * | 10/1987 |
| GB | 2322082 A | * | 8/1998 |
| WO | WO-94/13365 A1 | * | 6/1994 |
| WO | WO-2009/125329 A1 | * | 10/2009 |

OTHER PUBLICATIONS

Machine Translation of Chinese Patent 1227763, Date Unknown.*
Machine Translation of French Patent 2597356, Date Unknown.*

* cited by examiner

*Primary Examiner* — Jeffry H Aftergut
(74) *Attorney, Agent, or Firm* — Woodard, Emhardt, Henry, Reeves & Wagner, LLP

(57) ABSTRACT

Aspects of the present disclosure include a pickleball paddle that is formed using a plastic or composite molded material. A composite material is wrapped around a center and placed in a mold to form a paddle frame or arranged around a paddle frame. In some embodiments, additional composite material is wrapped at specific positions to tune the balance point and rebound characteristics of the finished paddle The mold is heated to cure the composite material within the mold cavity. Face shells are then added to complete the paddle.

15 Claims, 16 Drawing Sheets

PICKLEBALL PADDLE AND METHOD OF MANUFACTURE

The present application claims the benefit of U.S. provisional application No. 62/706,172 filed on Aug. 4, 2021, which is incorporated by reference.

FIELD OF THE ENDEAVOR

The present disclosure deals with racquet sports and particularly paddles for use in playing the sport of pickleball.

BACKGROUND

Pickleball is a racquet sport played with paddles and a perforated plastic ball on a court that is similar to a tennis court. Players hit the ball over a net placed on the ground, similar to tennis, with the goal of hitting the ball so the opposing player cannot return the shot.

Typically paddles used in pickleball may be made of metal, wood or composite materials. The construction and the weight characteristics of the paddle can have an effect on how a ball rebounds off of the paddle when a player hits a shot. When a player hits a ball near an edge of the paddle, the result of the shot is different than when the ball is hit near the center of the paddle. Often, when the ball is hit near the edge of the paddle, power on the shot is lost, while more power is generated when the ball is hit near the center of the paddle. Different players may prefer either more power or more control. Therefore, it is desirable to provide paddles that have different characteristics yet also have sufficient rigidity and strength.

SUMMARY

The present disclosure pertains generally to the field of paddles used for racquet sports such as pickleball and particularly to a method of manufacturing such paddles. Aspects of the present disclosure include paddles formed using a plastic or composite molded material. More specifically, a sheet of composite material is wrapped around an inflatable bladder and placed in a mold. While heating the mold the bladder is inflated so that the composite material expands to fill the mold cavity. The material is then cured to form a rigid open frame for a paddle. An interior insert and face shells are then added to complete the paddle.

A representative method includes wrapping a composite material around the length of an inflatable tubular bladder to form an elongated roll with a first end, a second end and a middle length therebetween, and arranging the elongated roll in the mold cavity of a mold defining the peripheral frame of a pickleball paddle with an open center area. The first end is adjacent a butt end of the mold, the middle length extends inward through a handle area of the mold, around a blade periphery portion of the mold and then outward through the handle area, and the second end is also arranged adjacent the butt end of the mold. The method includes attaching a compressed gas source to the tubular bladder, closing the mold, supplying compressed gas to expand the tubular bladder in the mold so that the composite material expands to fill the mold cavity, and curing the expanded composite material to form a frame for a pickleball paddle with an open center area. The frame it then removed from the mold, an interior insert is placed within the open center area of the frame; and face shells are mounted on opposing faces of the frame.

In certain embodiments, a method of making a pickleball paddle includes wrapping an initial composite material around the length of an inflatable tubular bladder to form an elongated roll with a first end, a second end and a middle length therebetween, and wrapping additional composite material at specific limited positions on the inflatable tubular bladder to affect the characteristics such as weight and balance of the completed paddle.

In a further representative embodiment, a method of making a pickleball paddle includes wrapping a composite material around the length of an inflatable tubular bladder to form an elongated roll and arranging the elongated roll in the mold cavity of a mold defining the peripheral frame of a pickleball paddle with an open center area. The method includes closing the mold, inflating the tubular bladder in the mold so that the composite material expands to fill the mold cavity, curing the expanded composite material to form a frame for a pickleball paddle with an open center area, and removing the frame from the mold. An interior insert is placed within the open center area of the frame; and face shells are mounted on opposing faces of the frame.

DESCRIPTION OF PREFERRED EMBODIMENTS

Figure 1:
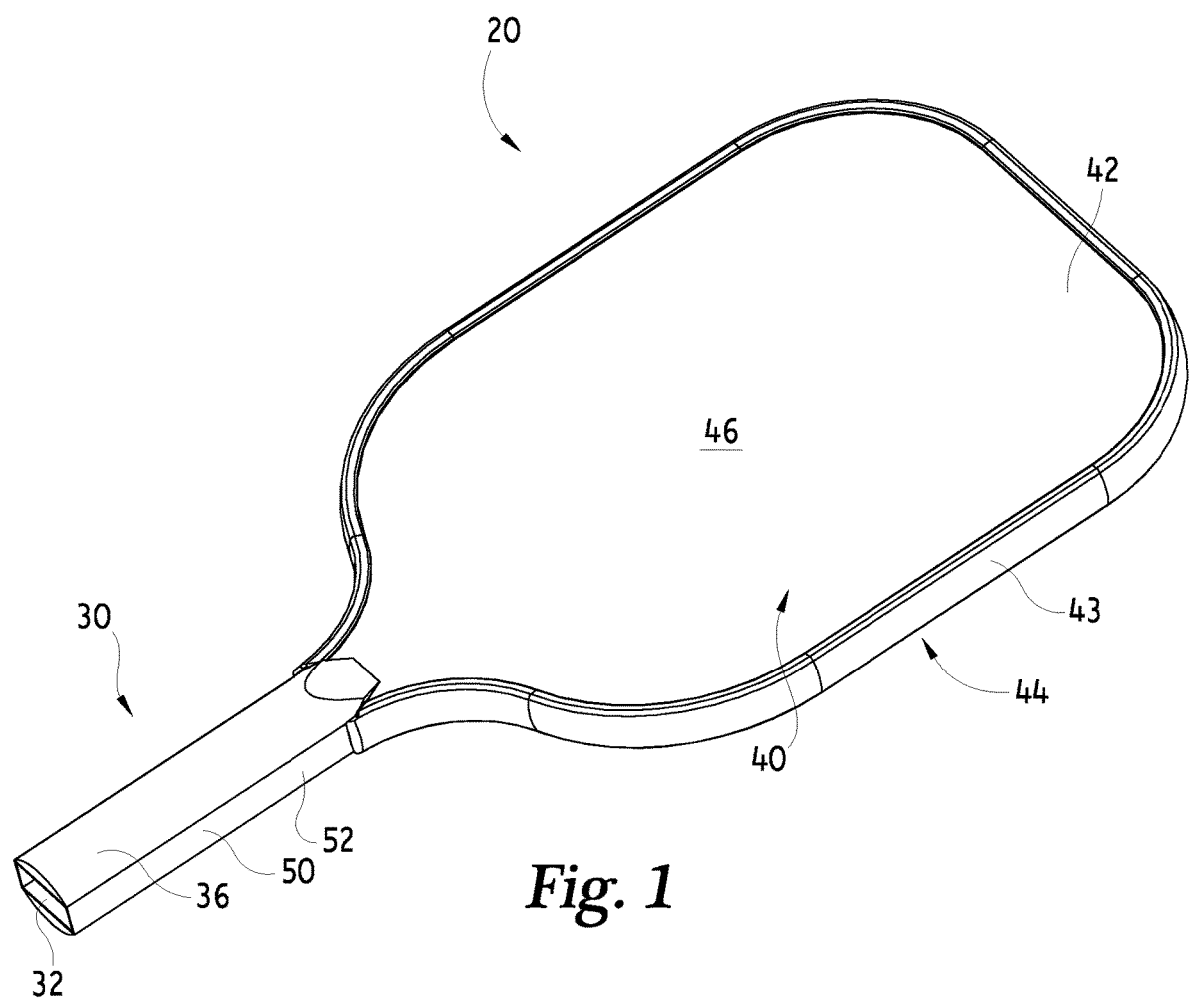
FIG. 1 is a perspective view of an embodiment of a paddle according to the disclosure.

For the purposes of promoting an understanding of the principles of the disclosure, reference will now be made to the embodiments illustrated in the drawings and specific language will be used to describe the same. It will nevertheless be understood that no limitation of the scope of the disclosure is thereby intended, such alterations and further modifications in the illustrated device, and such further applications of the principles of the disclosure as illustrated therein being contemplated as would normally occur to one skilled in the art to which the disclosure relates.

The present disclosure pertains generally to the field of paddles used for racquet sports such as pickleball and particularly to a method of manufacturing such paddles. Aspects of the present disclosure include paddles formed using a plastic or composite molded material. More specifically, a sheet of composite material is wrapped around an inflatable bladder and placed in a mold. While heating the mold the bladder is inflated so that the composite material expands to fill the mold cavity. The material is then cured to form a rigid open frame for a paddle. An interior insert and playing surfaces in the form of face shells are then added to complete the paddle.

The International Federation of Pickleball (IFP) and USA Pickleball endorse rules of pickleball for tournament play and international competitions. The rules include equipment requirements that specify allowable paddle characteristics. A pickleball paddle must be constructed from a relatively rigid, non-compressible material. The hitting surface of the paddle cannot include holes, indentations, textured material, or any feature that applies additional spin to the ball. Rubber, synthetic rubber, sandpaper, moving parts that increase momentum, springs or spring-like material, and flexible membranes or compressive material that creates a trampoline effect are not allowed on the surface of the paddle.

The rigidity and compressibility of a paddle is determined using a deflection test. A common deflection test used to determine the rigidity of a paddle applies a force of 3 kg to the center of the paddle. The distance the paddle deflects due to the 3 kg force is recorded to provide a measurement of the paddle's rigidity. A paddle that has a deflection of 0.005 inches or less in the 3 kg test is considered to meet the rigidity specifications.

In addition to regulating the rigidity of a paddle, the IFP and USA Pickleball also specify size requirements. The combined length and width of a paddle cannot exceed 24 inches. These measurements include any additional length or width added by an edge guard or a butt cap added to the end of the handle. There are no restrictions on the weight of the paddle or the thickness of the paddle.

FIG. 1 illustrates a representative example of a finished pickleball paddle 20 including a handle 30 and a blade 40. Handle 30 has a butt end 32. Handle grips 36 may be applied to the front and rear of handle 30. Blade 40 is formed from a frame 50, a center insert 60, a front shell 42 and a rear shell 44. Front shell 42 defines a planar front face 46 and rear shell 44 defines a symmetric planar rear face. The faces are the parts of blade 40 that strike the ball during play. Frame 50 includes an outer facing perimeter edge 52. In the illustrated embodiment, the majority of frame edge 52 is covered by an optional edge guard 48. It should be understood that the terms "front" and "rear" to describe the faces and shells are relative terms that describe the paddle as shown in the figures and are merely used for ease of description. In use, the orientation of the shells of the paddle is not important and either side of the paddle may be used to strike a playing object such as a pickleball.

Optionally in any of the embodiments disclosed, an edge guard 48 may be applied around the outer periphery of blade 40, step 224. The edge guard 48 may be used to keep edge 52 from being damaged. The edge guard 48 may be made of rubber, plastic, vinyl, silicone, or any other suitable material for protecting edge 48. Edge guard may extend substantially around the entire periphery of blade 40 except the handle area, or may alternately cover selected locations. In certain embodiments, the edge guard extends from the nine o'clock position to the three o'clock position around blade 40, using the handle as a six o'clock position for reference. In alternate embodiments, the edge guard 40 extends from the ten o'clock position to the two o'clock position around blade 40

Also optionally in any of the embodiments disclosed, grips 36 may be applied to handle 30 to create a standardized or custom fitted circumference. The grips 36 may be panels, a wrap or a thermoplastic overmolded foam. A handle cap may also be applied to butt end 32.

Figure 2:
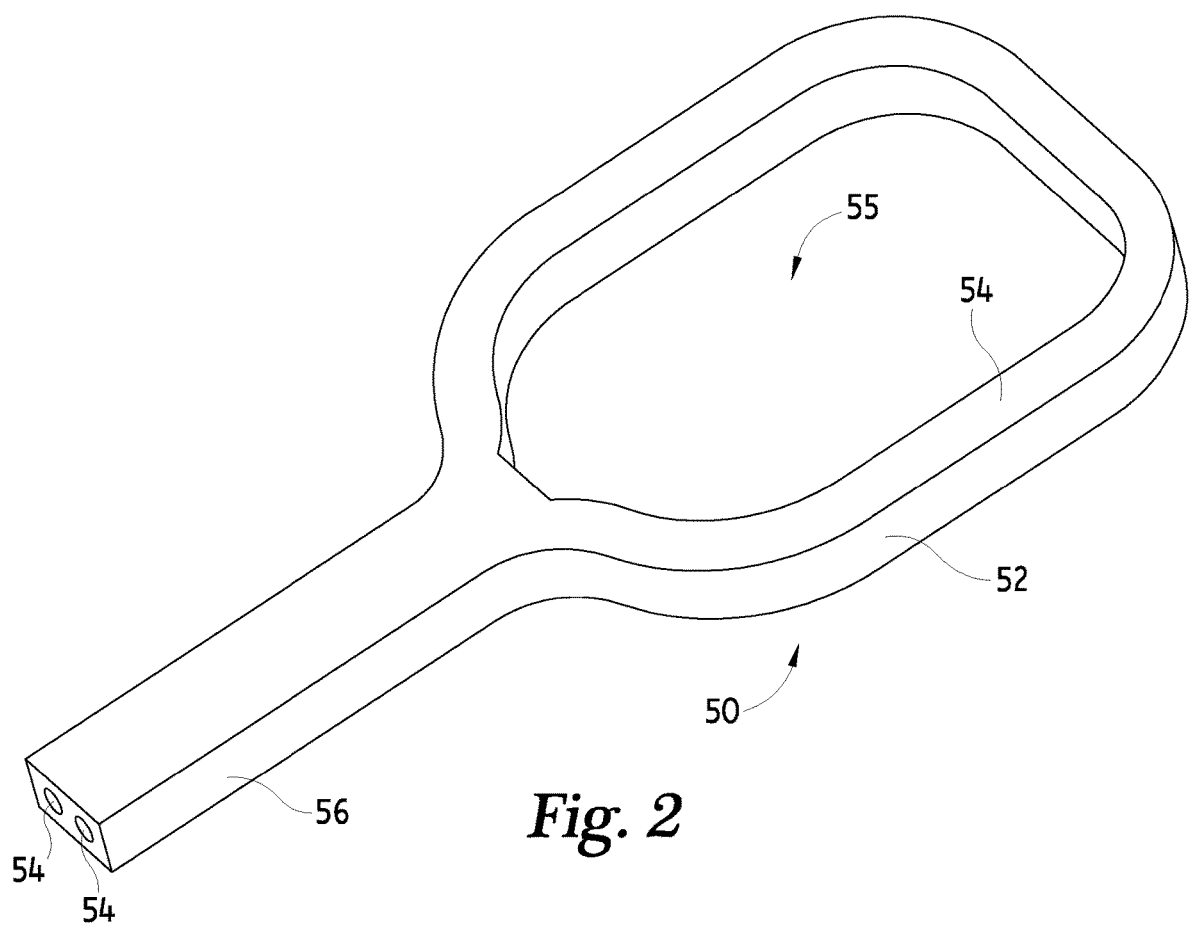
FIG. 2 is a perspective view of a paddle frame used in the embodiment of FIG. 1.
Figure 3:
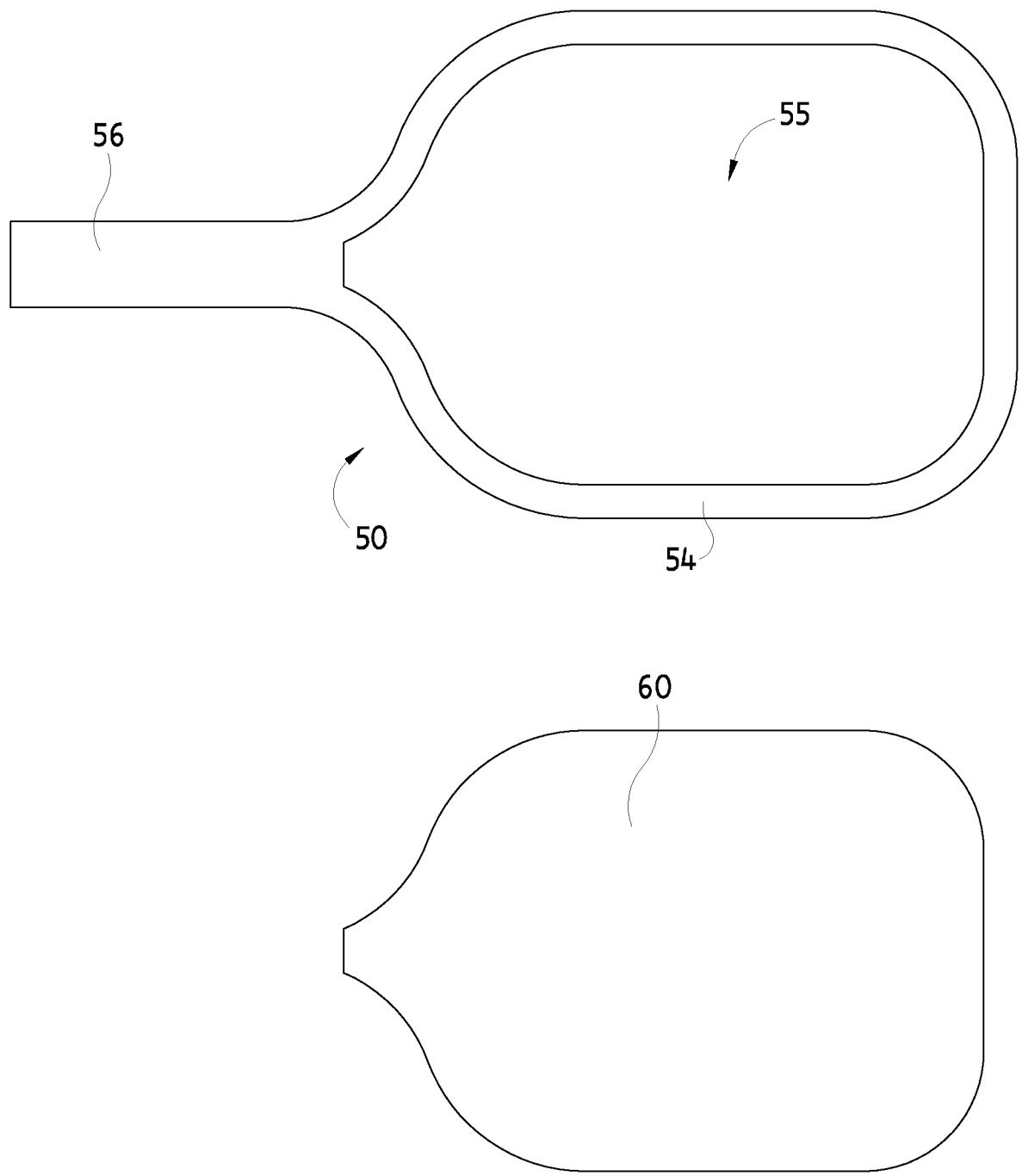
FIG. 3 is a top view of a paddle frame and insert used in the embodiment of FIG. 1.

According to one method embodiment, FIGS. 2 and 3 illustrate frame 50 separately. Frame 50 includes a rigid shaped blade periphery 54 and handle portion 56. In the illustrated embodiment, the blade shape is substantially rectangular with rounded corners and with the lower end tapering into handle 30. Blade periphery 54 defines an open center area 55. Insert 60 is sized and shaped to snugly fit into center area 55.

Frame 50 is formed of a graphite or composite material. "Graphite" or "composite" herein are intended to have their art recognized meanings, generally including fibers in a resin material. The fibers are typically made of graphite, carbon, glass, boron, synthetic fibers such as Kevlar®, fiberglass or other conventional materials. A composite sheet or prepreg sheet can be formed with fibers arranged in parallel and/or in a weave in a resin matrix.

Figure 4A:
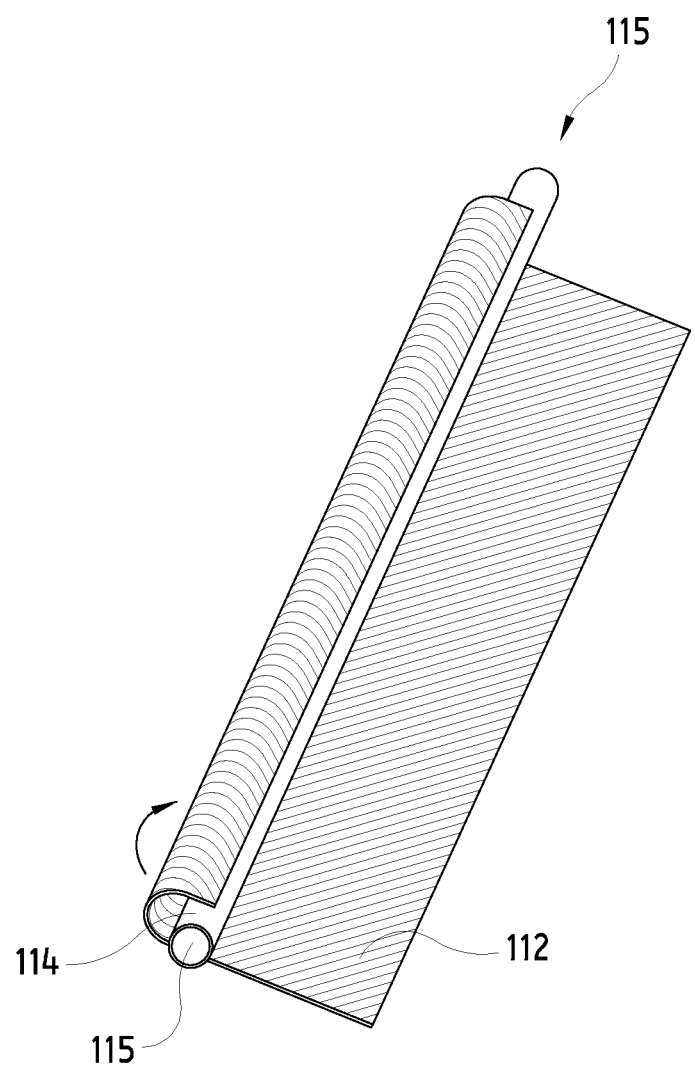
FIG. 4A is a perspective view of a composite sheet and bladder used in making the paddle frame of FIG. 2.
Figure 4B:
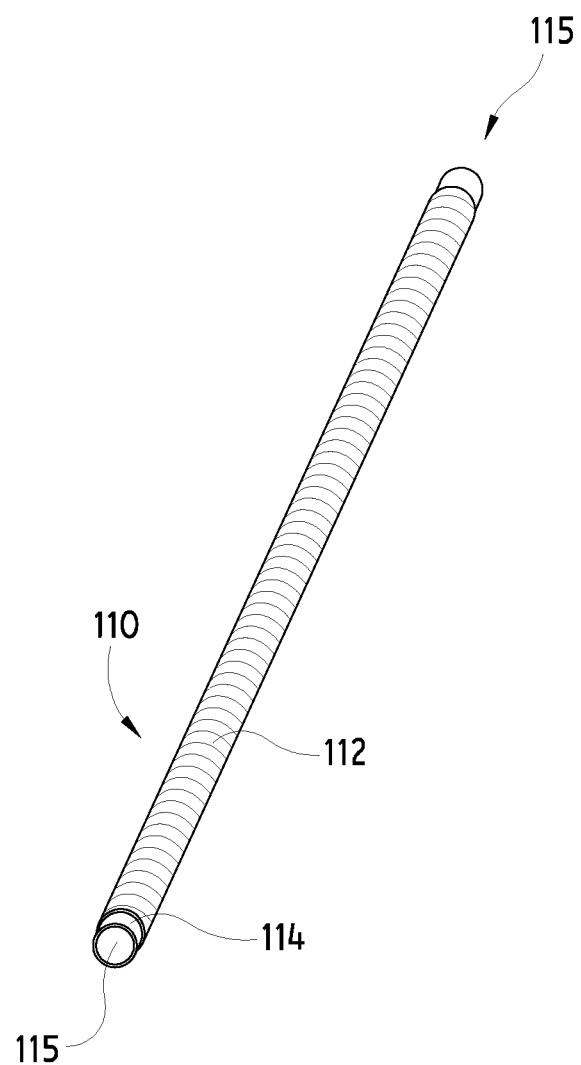
FIG. 4B is a perspective view of an elongated roll formed by the composite sheet and bladder of FIG. 4A.

A method 200 of manufacturing frame 50 is illustrated and described in FIGS. 4A-6. As illustrated in FIG. 4A, the process begins using a sheet of composite material 112 and a center in the form of an inflatable tubular bladder 115. The bladder 114 preferably forms a hollow tube with first and second open ends 115. In alternate embodiments, bladder 114 may only have one open end and the other end is closed. The closed end may be formed with a seal or closed with a plug. Initially the tubular bladder 114 is arranged lengthwise across the sheet 112. Sheet 112 is then tightly rolled around bladder 114, step 210, to form an elongated roll 110 shown in FIG. 4B with a first end, a second end and a middle length therebetween. Bladder ends 115 may slightly protrude from the ends of elongated roll 110.

The roll 110 is then arranged in a frame mold 120, step 212. Mold 120 may be a two-part mold with a top and bottom that matingly close; only one part of the mold is shown for ease of illustration. The length of the elongated roll 110 is placed in a mold cavity 122, so that the first end 116 is adjacent the butt end of the mold. The middle length 117 of roll 110 is arranged to extend inward through the handle area 124, around a blade periphery portion 126 of the mold and then outward through handle area 124. The second end 118 of roll 110 is then also arranged adjacent the butt end of the mold. The roll ends 116, 118 and/or the bladder ends 115 may slightly protrude from mold 120.

As step 214, a compressed gas source is attached to both open ends 115 of bladder 114, or only one end if the other end is closed, and the mold 120 is closed. The compressed gas may be ambient air or an inert or non-reactive gas. The mold 120 is then heated. During the heating process gas pressure is applied to inflate bladder 114 to inflate and stretch composite sheet 112 so that it expands to fill the cross-section of mold cavity 122 throughout the handle portion 124 and the blade periphery portion 126. The composite material is then cured and fused to form frame 50 as shown in FIG. 2, step 216. The bladder 114 may melt during this process. The bladder location may leave a void or channel within the periphery of frame 50 and two channel openings 58 defined in the butt end 32 of the handle.

Once the curing process is complete, the completed paddle frame 50 is removed from mold 120, step 218, and allowed to cool. Insert 60 is then placed into the center area 55 of frame 50, step 220. Insert 60 may be secured to frame 50 via a friction fit, adhesive, or a fusing process. In a less preferred alternative, fasteners may be used. As step 222, front and rear shells 42, 44 are then applied to combine and connect frame 50, shells 42, 44 and insert 60 to form paddle 20. Shells 42, 44 may be secured using adhesive or a fusing process. In a less preferred alternative, fasteners may be used.

In some embodiments, the interior channels left by the bladder in the completed frame are left empty; however, in other embodiments, the channels are filled with a filler material, such as foam, rubber, or silicone. Filler material may be used to provide additional support to paddle 20 and may also dampen sound or vibration when a playing object, such as a pickleball, is struck by paddle 20.

Figure 7A:
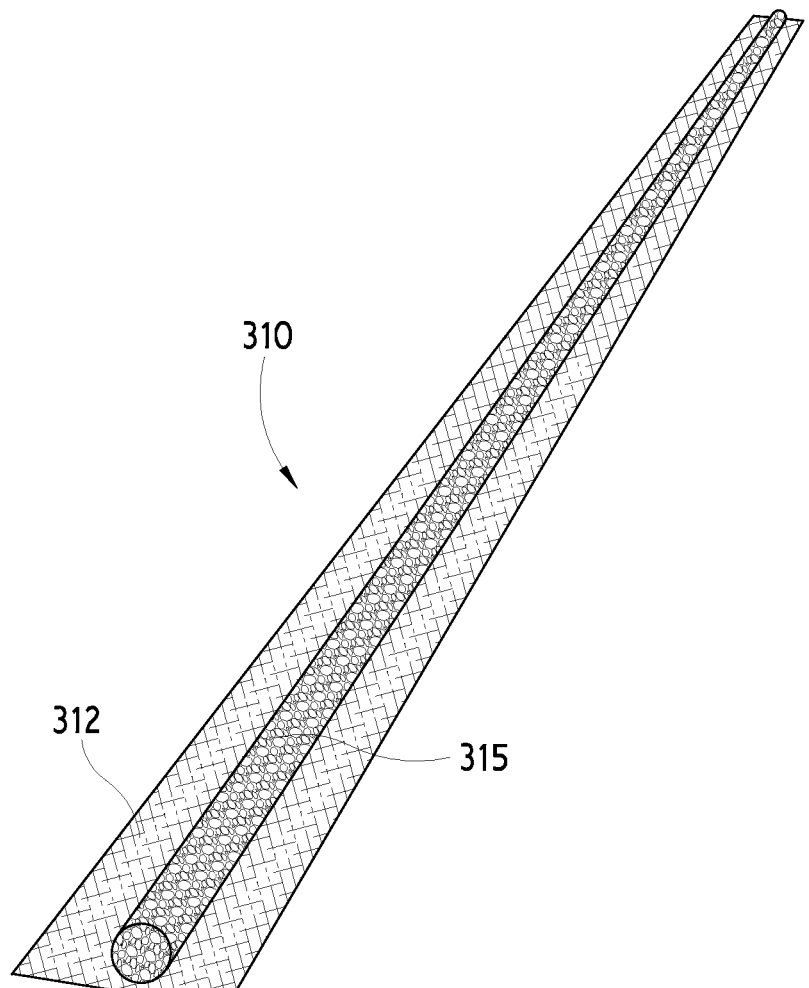
FIG. 7A is a perspective view of a composite sheet and center used in an alternate embodiment of making the paddle of FIG. 1.
Figure 7B:
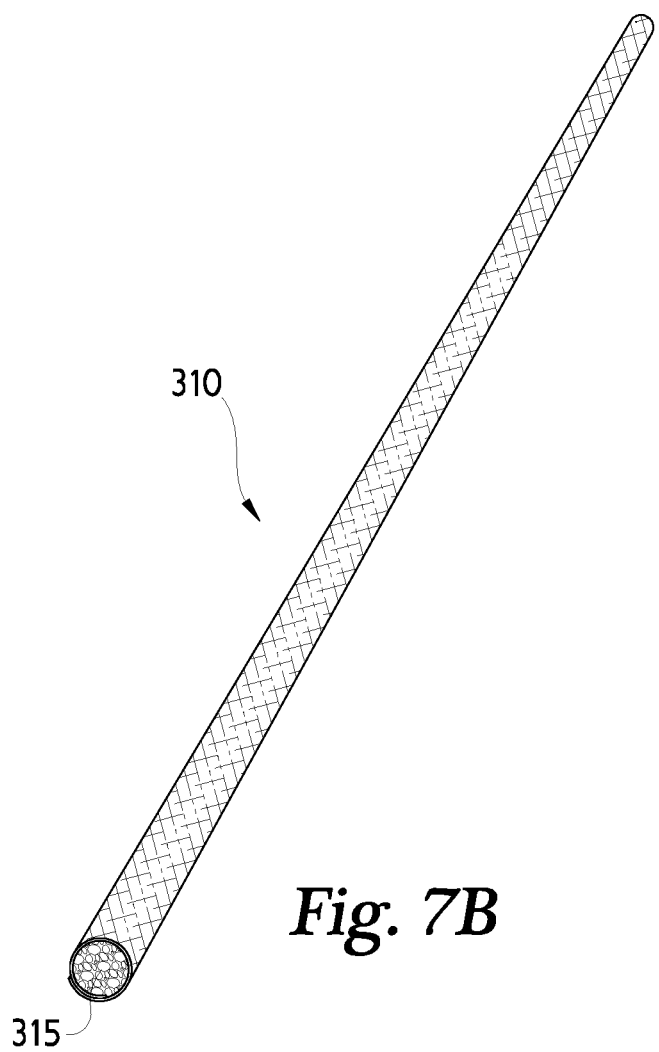
FIG. 7B is a perspective view of an elongated roll formed by the composite sheet and center of FIG. 7A.

FIGS. 7A-12 illustrate an alternate method 400 of making paddle 20 of FIG. 1. As illustrated in FIG. 7A, the process begins using a sheet of composite material 112 and a polyurethane foam center 315 arranged as a stripe, a line or a solid or hollow tube of foam arranged lengthwise across the sheet 312. The amount and density may be selected in various embodiments to provide desired rebound and damping characteristics. Sheet 312 is then tightly rolled around center 315, step 410, to form an elongated roll 310 shown in FIG. 7B with a first end, a second end and a middle length therebetween. Center ends 315 may slightly protrude from the ends of elongated roll 310.

Figure 8:
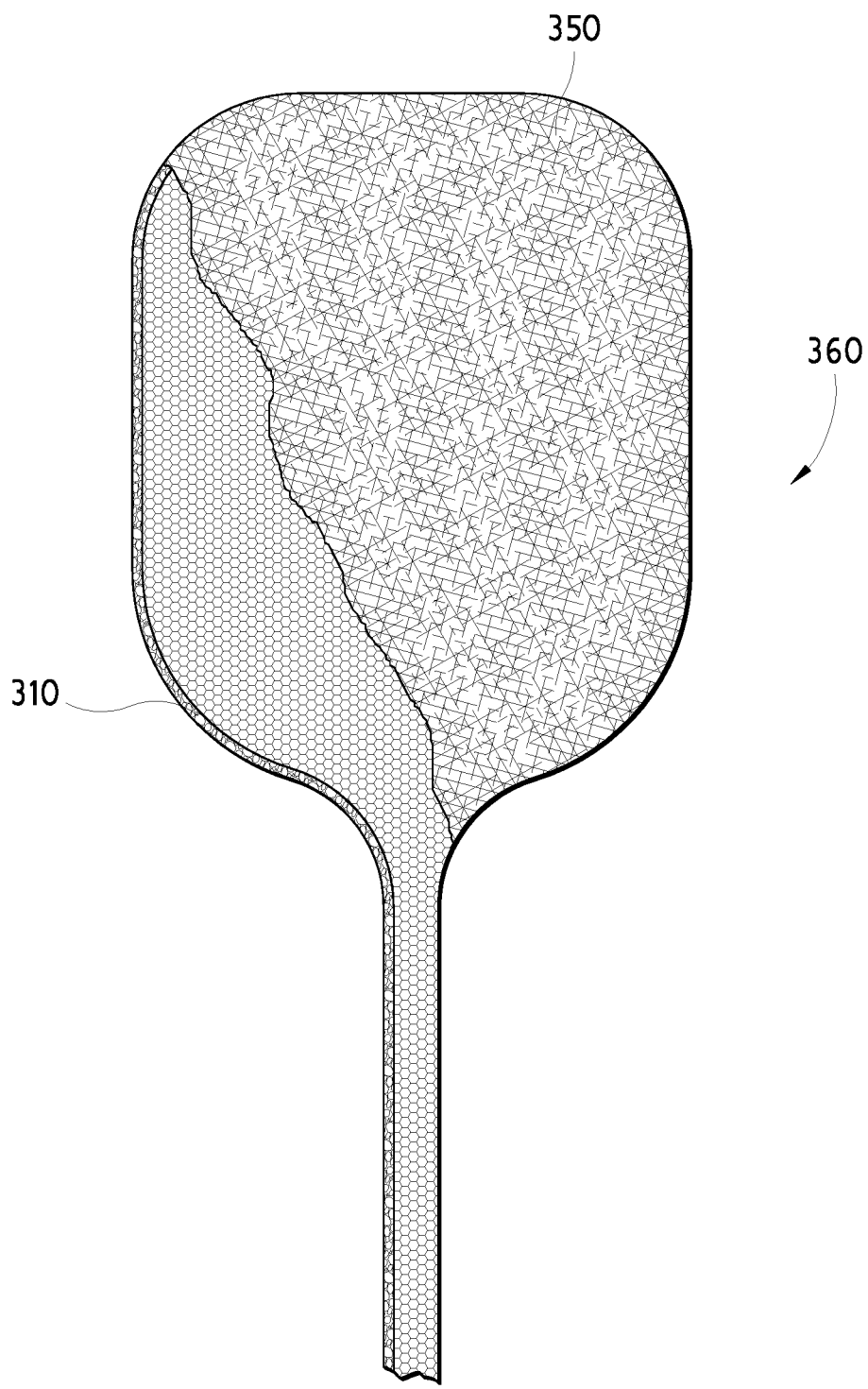
FIG. 8 is a view of the elongated roll of FIG. 7B wrapped around a paddle frame to form a blank.

As illustrated in FIG. 8, in step 412, the roll 310 is wrapped around the perimeter of a paddle frame 350 to form paddle blank 360. The length of the elongated roll 310 is placed around the paddle frame 350 so that the first end is adjacent the butt end of the frame. The middle length of roll 310 is arranged to extend around a blade portion of the frame and then outward along the handle area. The second end of roll 310 is then also arranged adjacent the butt end of the frame.

Figure 9A:
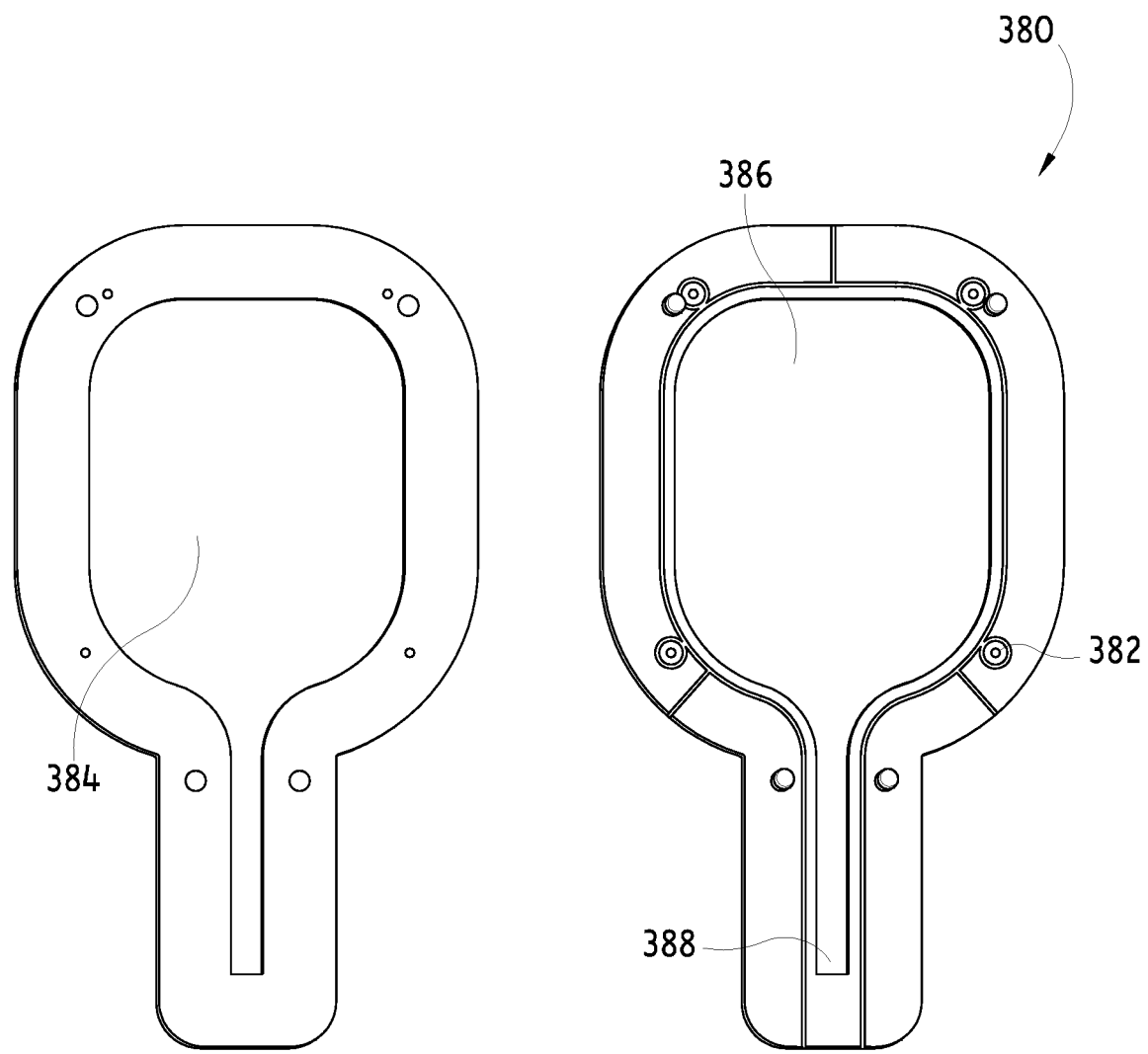
FIG. 9A is an open view of a mold to receive the blank of FIG. 8.
Figure 9B:
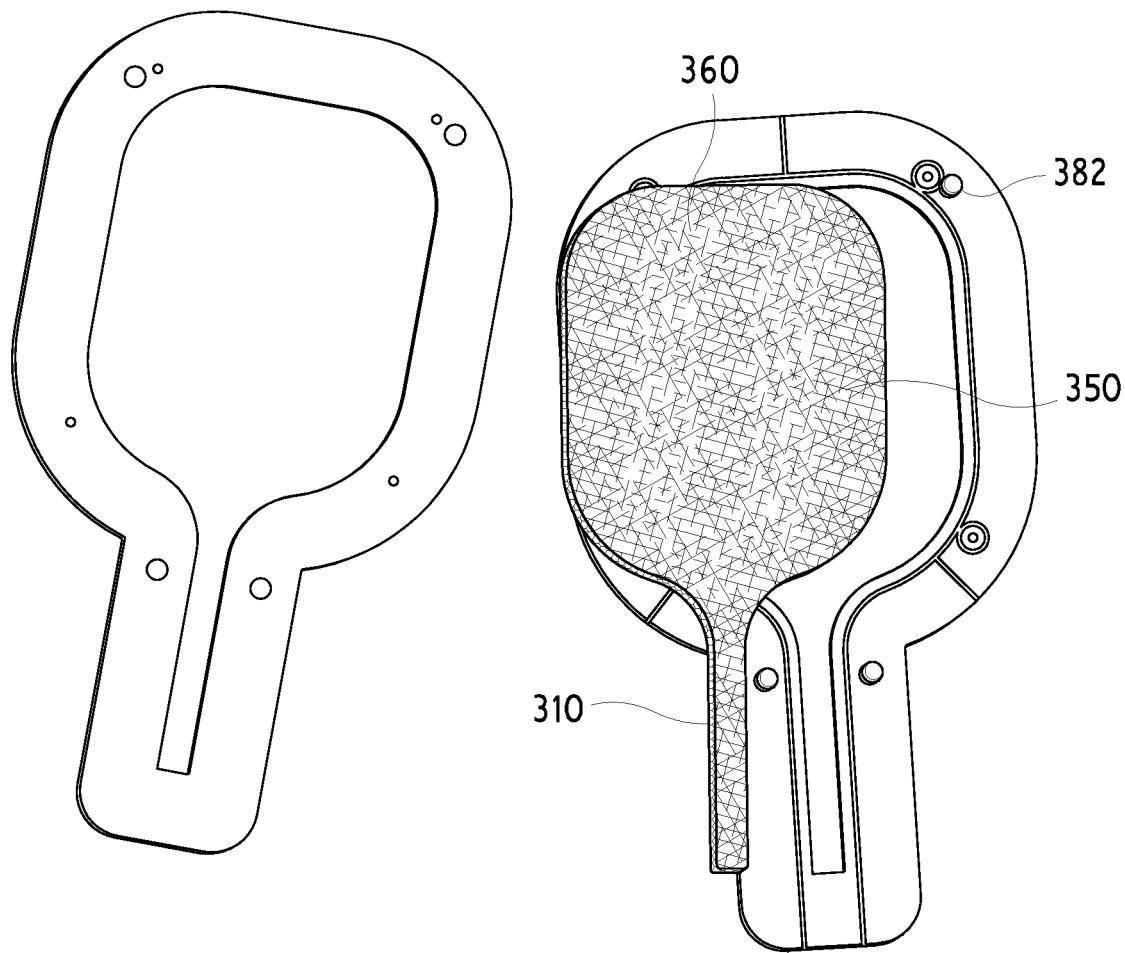
FIG. 9B is a view of the blank of FIG. 8 being placed in the mold of FIG. 9A.
Figure 10:
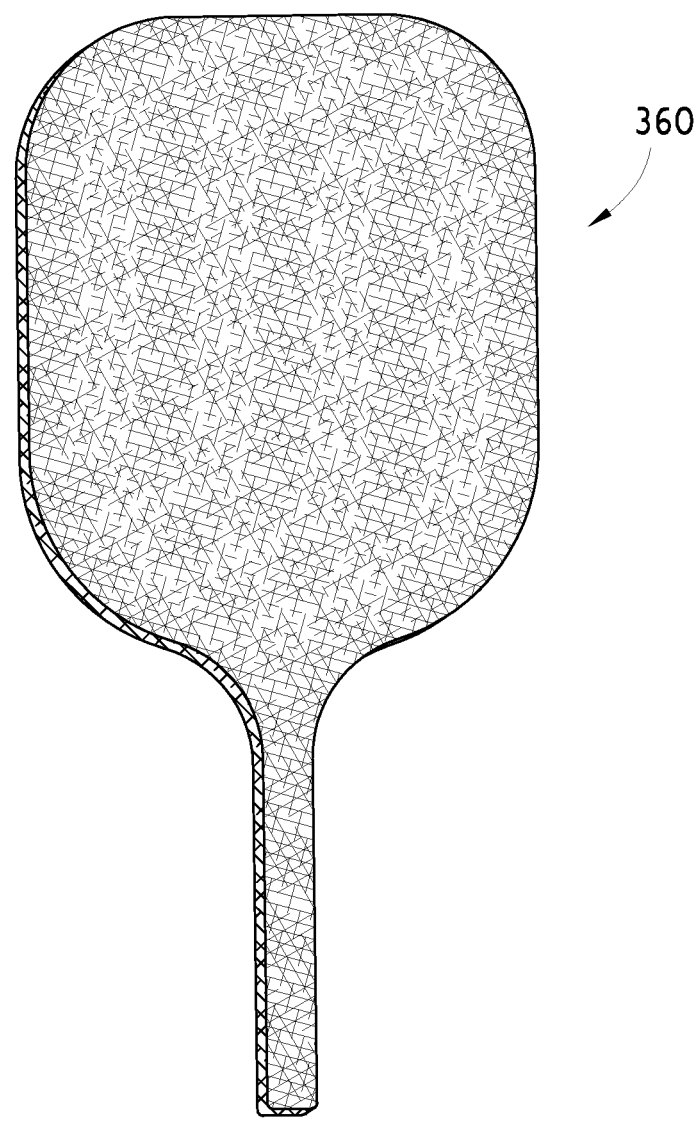
FIG. 10 is a view of a paddle blank removed from a mold.
Figure 11A:
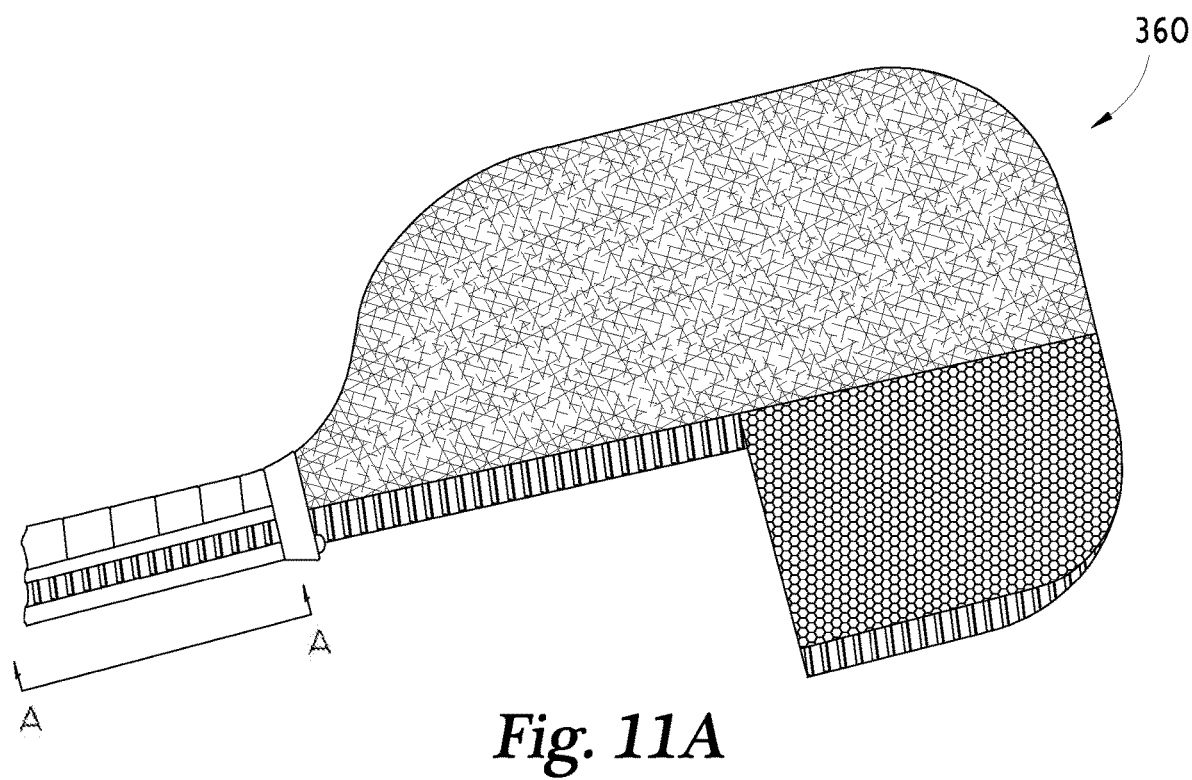
FIG. 11A is a view of a finished paddle blank.
Figure 11B:
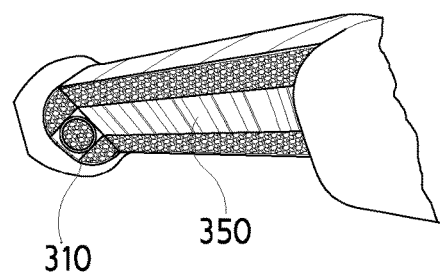
FIG. 11B is a cut-away view of the finished paddle blank of FIG. 11A take along lines A-A.
Figure 12:
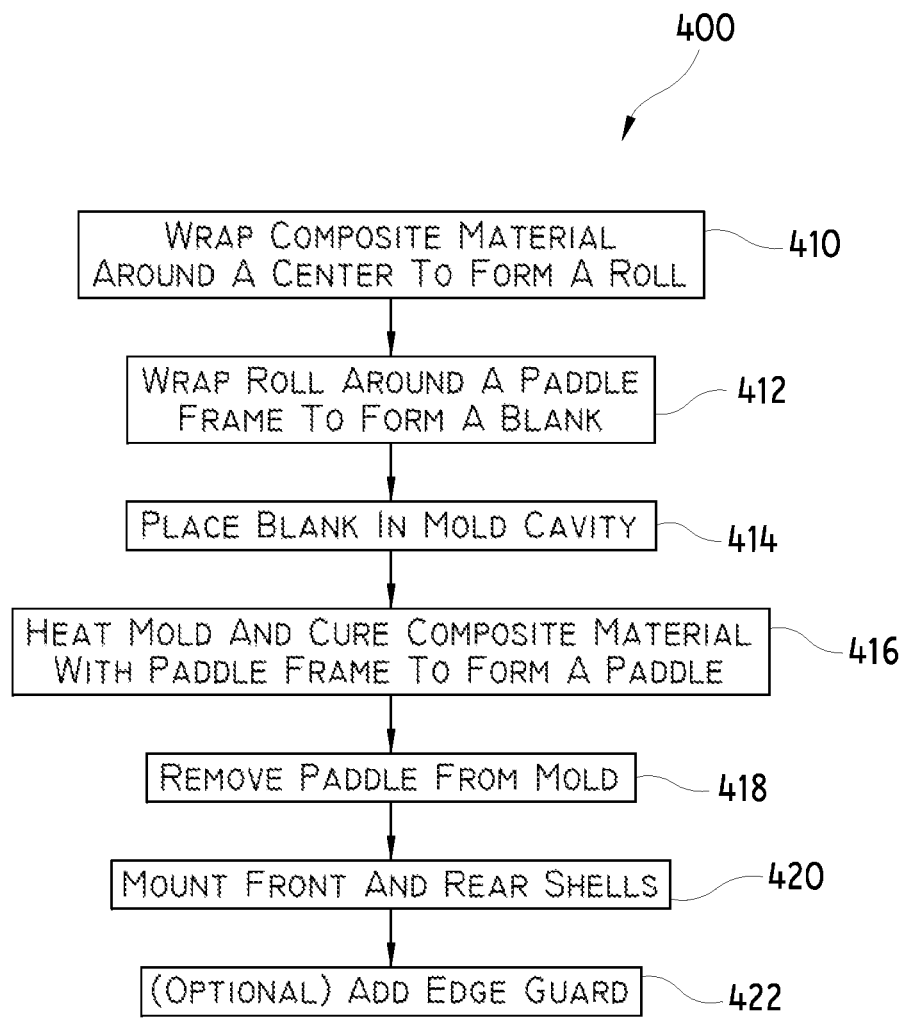
FIG. 12 is an alternate process for making the paddle of FIG. 1.

FIGS. 9A & 9B illustrate a mold 380 for curing paddle blank 360. Mold 380 includes a first half 382 and a second half 384. A cavity in the mold includes a blade cavity portion 386 and a handle cavity portion 388. In step 414, paddle blank 360 is placed into the mold cavity. The mold it then closed and heated, step 416. Heating the mold causes the composite material in roll 310 to fuse with paddle frame 350, forming an integrated piece with the foam center 315 embedded around the perimeter of paddle blank 360.

Once the curing process is complete, the completed paddle blank 360 is removed from mold 380, step 418, and allowed to cool. As step 420, front and rear shells 42, 44 are then applied to paddle blank 360 to finish paddle 20. Shells 42, 44 may be secured using adhesive or a fusing process. In a less preferred alternative, fasteners may be used. Grip portions may be added if needed. Optionally, an edge guard may be added, step 422.

Figure 4C:
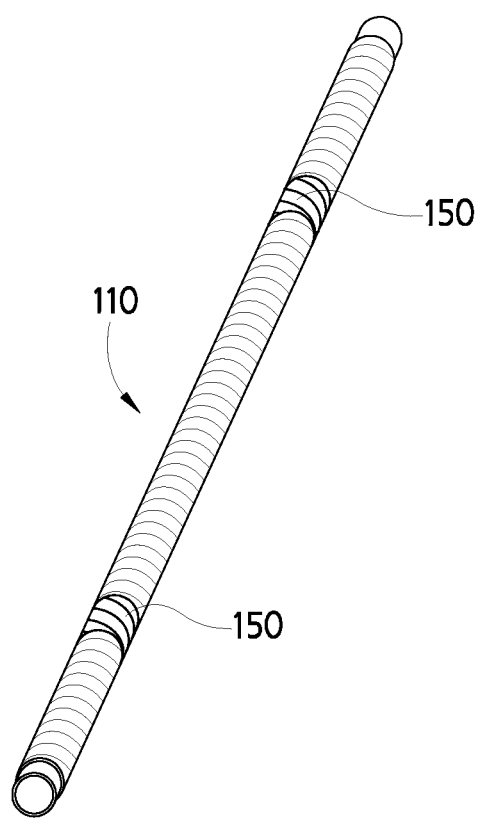
FIG. 4C is a perspective view of the elongated roll of FIG. 4A with additional material added.
Figure 5:
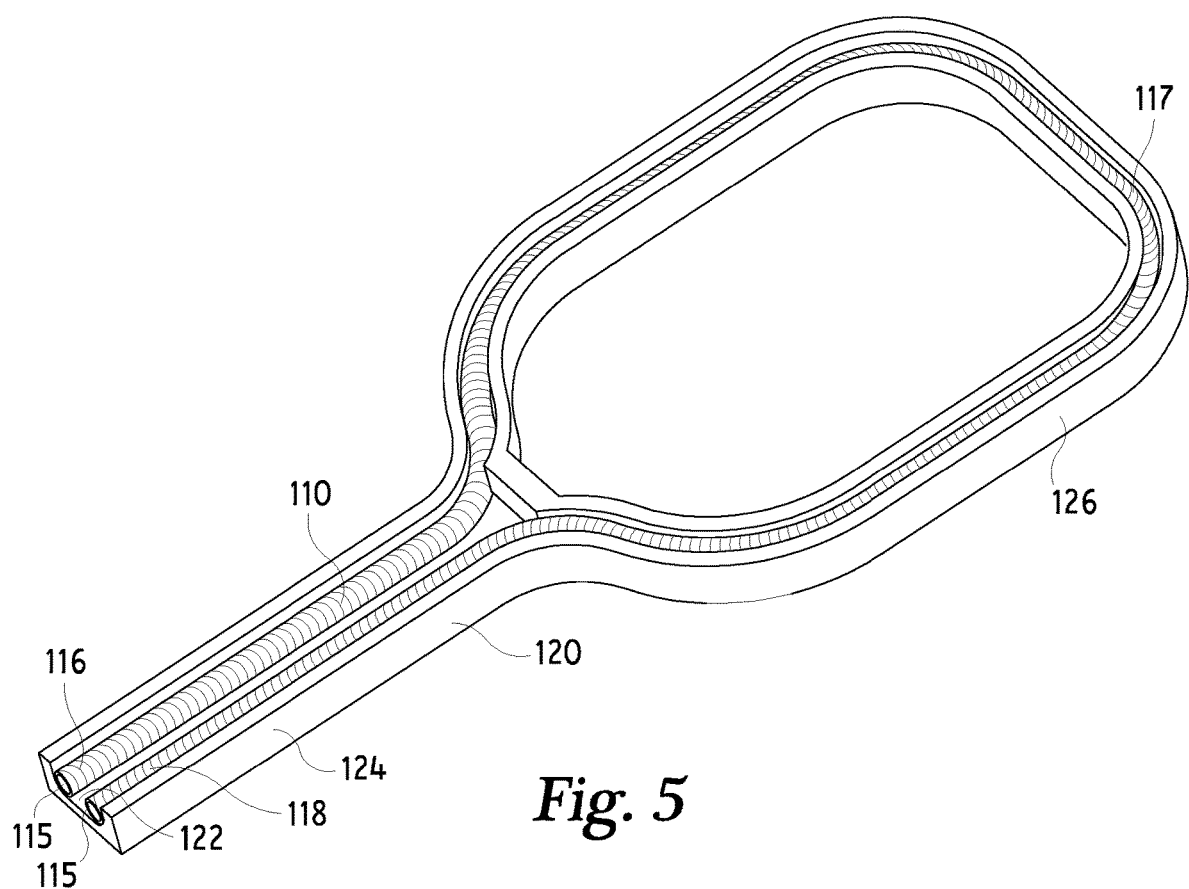
FIG. 5 is a cut-away view of a roll of the composite sheet and bladder in a mold.
Figure 6:
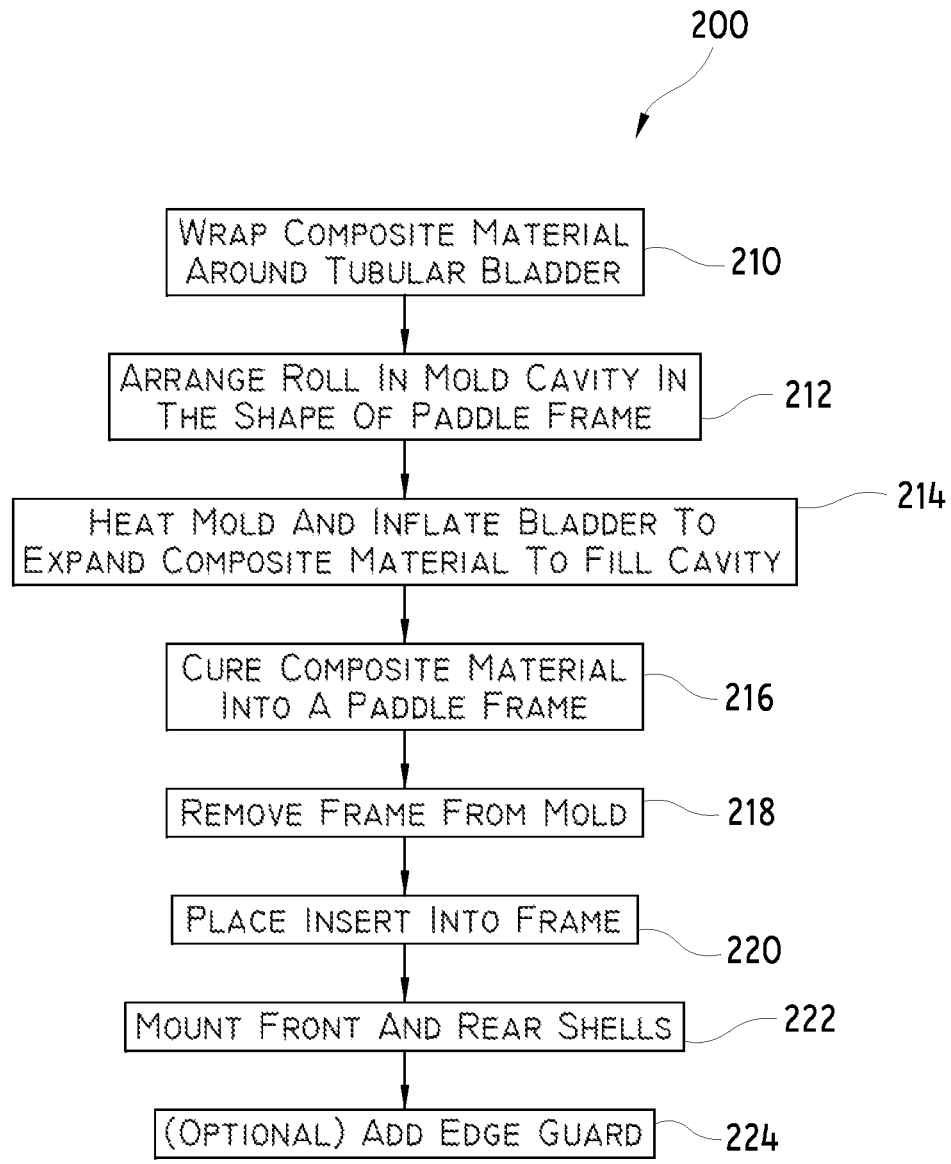
FIG. 6 is process for making the paddle of FIG. 1.

According to any of the embodiments herein, the playing characteristics of paddle 20 can be selected or customized depending on the materials used to form the composite roll and their placement. Specifically, the frame characteristics can be selected by changing the material characteristics at specific positions along the length of the roll. FIG. 4C illustrates elongated roll 110 with additional composite material 150 at representative locations. Addition additional composite material 150 added at precise locations along the length of roll 110 can be used to precisely affect corresponding locations around the perimeter of frame 50 when the roll is arranged in the mold and corresponding the finished paddle 20. The additional composite material may be in the form of a broad prepreg sheet or alternately a relatively narrow strip or tape of composite material. For example, greater or lesser thicknesses of material can be placed in certain locations where thicker or thinner frame walls are desired. In alternate embodiments, materials such as fiberglass, Kevlar type fibers, or ceramics can be added to selected portions of the roll to affect the strength, rigidity, flexibility, density or other characteristics. In certain embodiments, the additional composite material may include fibers in parallel to the fibers in the initial composite material, alternately the additional composite material may include fibers at a transverse or non-parallel angle to the fibers in the initial composite material.

For instance, weight may be added at the 9 o'clock and 3 o'clock positions or at the 10 o'clock and 2 o'clock positions, using the handle as 6 o'clock position for reference. Weight locations can be used to tune the balance point and rebound characteristics of the paddle. Greater rebound energy is transferred to a ball when hit at the sweet spot compared to other portions of the paddle. Moving the balance point of paddle 20 moves the sweet spot of the paddle, so the sweet spot may be moved to an optimal location for where a particular type of player is most likely to hit the ball off of the paddle. Optionally, increasing the rigidity causes the paddle to transfer less rebound energy to the ball and to generate less power on a shot yet provides greater shot control. It may be desirable to trade some rebound energy in exchange for the greater control provided by increased rigidity. Conversely, less rigidity produces more rebound energy transferred to the ball from the paddle 20. This generates greater power to make up for power that is lost due to deflection of the paddle and inefficient transfer of momentum when missing the sweet spot.

While the disclosure has been illustrated and described in detail in the drawings and foregoing description, the same is to be considered as illustrative and not restrictive in character, it being understood that only a preferred embodiment has been shown and described and that all changes and modifications that come within the spirit of the disclosure are desired to be protected.

What is claimed is:

1. A method of making a pickleball paddle, comprising:
   wrapping a composite material around a length of a center to form an elongated roll with a first end, a second end and a middle length therebetween;
   wrapping the length of the elongated roll around a perimeter of a paddle frame to form a paddle blank;
   placing the paddle blank in a mold cavity;
   closing the mold cavity;
   heating the mold to fuse the composite material with the frame, forming an integrated piece with the center embedded around the perimeter of the paddle blank;
   removing the paddle blank from the mold to form a completed frame; and
   mounting face shells on opposing faces of the paddle blank.

2. The method of claim 1, comprising wrapping additional composite material at specific positions on the center when forming the elongated roll to affect a weight and balance point of the completed frame.

3. The method of claim 2, comprising wrapping additional composite material to add weight at positions on the center corresponding to 9 o'clock and 3 o'clock positions around the perimeter of the frame.

4. The method of claim 2, comprising wrapping additional composite material to add weight at positions on the center corresponding to 10 o'clock and 2 o'clock positions around the perimeter of the frame.

5. The method of claim 1, wherein the center is a polyurethane foam material.

6. The method of claim 1, where the center is an inflatable tubular bladder and comprising the steps of attaching a compressed gas source to the inflatable tubular bladder and supplying compressed gas to inflate the elongated roll in the mold cavity so that the composite material expands to fill the mold cavity.

7. The method of claim 6, comprising melting the tubular bladder during curing.

8. The method of claim 6, comprising placing a filler material in interior channels defined by the tubular bladder during the molding process after the frame is cured.

9. The method of claim 1, wherein wrapping the length of the elongated roll around a perimeter of a paddle frame to form a paddle blank comprises placing the elongated roll around the paddle frame so that a first end is adjacent a butt end of the paddle frame, so that a middle length of the roll extends inward along a handle, around a blade portion of the paddle frame and then outward along the handle so that a second end of the roll is arranged adjacent the butt end of the paddle frame.

10. A method of making a pickleball paddle, comprising:
wrapping an initial composite material around a length of a center to form an elongated roll with a first end, a second end and a middle length therebetween;
wrapping additional composite material at specific limited positions on the center to affect a weight and balance point of a completed paddle;
wrapping the length of the elongated roll around a perimeter of a paddle frame to form a paddle blank comprises placing the elongated roll around the paddle frame so that a first end is adjacent a butt end of the paddle frame, so that a middle length of the roll extends inward along a handle, around a blade portion of the paddle frame and then outward along the handle so that a second end of the roll is arranged adjacent the butt end of the paddle frame;
placing the paddle blank in a mold cavity of a mold;
closing the mold;
heating the mold to fuse the composite material with the paddle frame and forming an integrated piece with the center embedded around the perimeter of paddle blank;
removing the paddle blank from the mold; and
mounting face shells on opposing faces of the paddle blank.

11. The method of claim 10, comprising wrapping additional composite material to add weight at positions on an inflatable tubular bladder for the center corresponding to 9 o'clock and 3 o'clock positions around a perimeter of the frame.

12. The method of claim 10, comprising wrapping additional composite material to add weight at positions on an inflatable tubular bladder for the center corresponding to 10 o'clock and 2 o'clock positions around the perimeter of the frame.

13. The method of claim 10, wherein the additional composite material include fibers at a non-parallel angle to fibers in the initial composite material.

14. The method of claim 10, wherein the center is a polyurethane foam material.

15. The method of claim 10, where the center is an inflatable tubular bladder and comprising the steps of attaching a compressed gas source to the inflatable tubular bladder and supplying compressed gas to inflate the elongated roll in the mold so that the composite material expands to fill the mold cavity.

* * * * *